United States Patent
Bone et al.

(10) Patent No.: US 10,700,874 B2
(45) Date of Patent: Jun. 30, 2020

(54) MACHINE TO MACHINE VIRTUAL PRIVATE NETWORK

(71) Applicant: Vodafone IP Licensing Limited, Berkshire (GB)

(72) Inventors: Nicholas Bone, London (GB); Tim Snape, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 363 days.

(21) Appl. No.: 15/208,073

(22) Filed: Jul. 12, 2016

(65) Prior Publication Data
US 2017/0054564 A1 Feb. 23, 2017

(30) Foreign Application Priority Data

Jul. 13, 2015 (GB) .................................. 1512177.5

(51) Int. Cl.
*H04L 9/32* (2006.01)
*H04L 29/06* (2006.01)
(Continued)

(52) U.S. Cl.
CPC .......... *H04L 9/3263* (2013.01); *H04L 9/0861* (2013.01); *H04L 9/14* (2013.01);
(Continued)

(58) Field of Classification Search
CPC .......................... H04L 9/3263; H04L 63/0272
See application file for complete search history.

(56) References Cited

U.S. PATENT DOCUMENTS

| 7,234,063 B1 * | 6/2007 | Baugher | ............... H04L 9/0833 380/259 |
| 8,855,012 B1 * | 10/2014 | Suri | .................... H04L 12/2856 370/254 |

(Continued)

FOREIGN PATENT DOCUMENTS

| WO | WO-2004/107646 | 12/2004 |
| WO | WO-2011/030294 | 3/2011 |

OTHER PUBLICATIONS

Search Report dated Feb. 7, 2016 in Great Britain Application No. GB1512177.5.

(Continued)

*Primary Examiner* — Jason Chiang
(74) *Attorney, Agent, or Firm* — B. Aaron Schulman, Esq.; Stites & Harbison, PLLC

(57) ABSTRACT

System and method for providing secure machine to machine, M2M, communications comprising a device management, DM, server configured to obtain credentials of one or more M2M devices and provision the one or more M2M devices with credentials of a virtual private network, VPN. An application programming interface, API. A VPN server comprising a first communications interface configured to communicate API requests and API responses with the API. A second communications interface configured to provide a VPN for the one or more M2M devices. Logic configured to issue an API request, wherein the request includes the credentials of the VPN. Receive an API response from the DM server including an indication of the one or more M2M devices provisioned with the credentials of the VPN. Initiate a VPN over the second interface between the one or more M2M devices and the VPN server.

14 Claims, 3 Drawing Sheets

(51) Int. Cl.
  *H04W 4/70* (2018.01)
  *H04W 12/04* (2009.01)
  *H04L 9/08* (2006.01)
  *H04L 9/14* (2006.01)
  *H04L 9/30* (2006.01)

(52) U.S. Cl.
  CPC ............ *H04L 9/30* (2013.01); *H04L 63/0272* (2013.01); *H04L 63/06* (2013.01); *H04L 63/062* (2013.01); *H04L 63/0823* (2013.01); *H04L 63/104* (2013.01); *H04W 4/70* (2018.02); *H04W 12/04031* (2019.01); *H04L 2209/64* (2013.01); *H04L 2209/80* (2013.01)

(56) References Cited

U.S. PATENT DOCUMENTS

| | | | | |
|---|---|---|---|---|
| 9,258,295 | B1* | 2/2016 | Nedeltchev | H04L 63/0823 |
| 2003/0229786 | A1* | 12/2003 | Hollis | H04L 63/0442 |
| | | | | 713/168 |
| 2007/0006296 | A1* | 1/2007 | Nakhjiri | H04L 63/0272 |
| | | | | 726/15 |
| 2008/0034416 | A1* | 2/2008 | Kumar | H04L 63/0272 |
| | | | | 726/15 |
| 2012/0252481 | A1* | 10/2012 | Anpat | H04W 8/06 |
| | | | | 455/456.1 |
| 2013/0046976 | A1* | 2/2013 | Rosati | H04L 63/0853 |
| | | | | 713/168 |
| 2013/0297933 | A1* | 11/2013 | Fiducia | H04L 63/0853 |
| | | | | 713/156 |
| 2014/0123268 | A1 | 5/2014 | Farina et al. | |
| 2014/0215217 | A1 | 7/2014 | Gronowski et al. | |
| 2014/0372614 | A1* | 12/2014 | Tan | H04L 47/805 |
| | | | | 709/226 |
| 2015/0071139 | A1 | 3/2015 | Nix | |
| 2015/0127835 | A1 | 5/2015 | Zwaal | |

OTHER PUBLICATIONS

Search Report dated Nov. 9, 2016 in European Application No. 16179296.

* cited by examiner

MACHINE TO MACHINE VIRTUAL PRIVATE NETWORK

FIELD OF THE INVENTION

The present invention relates to a method and system for establishing a virtual private network for machine to machine devices.

BACKGROUND OF THE INVENTION

Many machine to machine (M2M) users require IPSec, SSL or other Virtual Private Networks (VPN) to be established between distributed M2M devices and their company premises (where there is typically a server called a VPN concentrator). Setting up a VPN involves a complex (and often manual) process of distributing pre-shared keys or certificates both to all the relevant M2M devices and to the VPN Server. Sending pre-shared keys to M2M devices remotely is difficult due to a lack of an end-to-end secure connection to distribute the keys.

The most widely used solution is manual distribution of a shared secret. For deployments with more than two peer devices, this is typically a group key, or sometimes individual device keys may be derived from a group key and device identifier. These solutions are cumbersome and have security limitations.

One solution from Microsoft Corp. involves automatically enrolling devices into a PKI and issuing the devices with device certificates so that they can then subsequently connect into a VPN. However, this has limitations. This system requires an enterprise PKI (certification authority (CA) hierarchy) to be established and for the enterprise to integrate into Microsoft Active Directory (to support automated certificate enrolment). Devices typically need to be joined to the domain at build time (e.g. by a Domain administrator) and this joining operation needs to be carried out within company premises. Support for devices which do not have a Microsoft Operating System can be problematic However, this system is not suitable for M2M devices as such devices do not typically have any form of Active Directory support and/or are activated in the field away from an enterprise's premises. The cost and overheads required for an enterprise to establish PKI for this purpose are also considerable.

Therefore, there is required a method and system that overcomes these problems.

SUMMARY OF THE INVENTION

A virtual private network (VPN) is set up between one or more M2M devices and a VPN server. Details or credentials of the VPN are provisioned on the M2M devices by a broker or other entity. The broker interacts with the VPN server over a network application programming interface (API). The VPN server issues an API request to the broker. The API request includes the credentials of the VPN server to be provisioned on the M2M devices. The broker issues an API response to the VPN including an indication of which M2M devices have been provisioned. Therefore, the VPN may be initiated. Further API requests and responses may be used to inform the VPN server of new M2M devices that have been provisioned or that should no longer be included (i.e. are unavailable for VPN). The broker may optionally provide the M2M devices with credentials (e.g. keys) of the VPN server, so that the server may be authenticated towards the devices (or the M2M devices may receive the VPN server credentials in advance). The broker may optionally provide the VPN server with credentials (e.g. keys) of the M2M devices so that the devices may be authenticated towards the server (or the VPN server may receive the M2M device credentials in advance). The credentials (keys) may be generated by the VPN server and/or by each M2M device or by the broker (i.e. the M2M devices have limited functionality). The broker may communicate securely with the M2M devices, preferably using general bootstrapping architecture (GBA).

In accordance with a first aspect there is provided a system for providing secure machine to machine, M2M, communications comprising:
a device management, DM, server configured to obtain credentials of one or more M2M devices and provision the one or more M2M devices with credentials of a virtual private network, VPN;
an application programming interface, API; and
a VPN server comprising:
  a first communications interface configured to communicate API requests and API responses with the API;
  a second communications interface configured to provide a VPN for the one or more M2M devices; and
  logic configured to:
    issue an API request, wherein the request includes the credentials of the VPN,
    receive an API response from the DM server including an indication of the one or more M2M devices provisioned with the credentials of the VPN, and
    initiate a VPN over the second interface between the one or more M2M devices and the VPN server. Therefore, VPNs can be more effectively and securely set up and managed for M2M devices that are typically unattended and have limited hardware.

Preferably, the DM server may be a network application function, NAF. The NAF may communicate securely using general bootstrapping architecture (GBA), for example. This further enhances security.

Advantageously, the API response may include credentials of the one or more provisioned M2M devices. Furthermore, the credentials may include any one or more of: M2M device identifier, IMEI, MAC address, IMSI, MSISDN, a device key for each M2M device, a device certificate for each device. Any other credentials may be used. Therefore, the VPN may be initiated using the M2M credentials.

Optionally, the request may comprise one or more request parameters selected from the group consisting of: VPN server identifier, VPN group key, certificate authority (CA) public key, CA certificate, VPN server public key, VPN server certificate and VPN server certificate request. These parameters may be passed by the DM server and ultimately on to the M2M devices so that they may be used to set up the VPN. Other parameters may be sent as well or instead of these parameters. The M2M device may initiate the VPN or the VPN server (or concentrator) may setup the VPN.

Optionally, the API request may further include credentials of the VPN server. The M2M device may also be provisioned with the credentials of the VPN server.

According to a second aspect there is provided a device management, DM, server for providing secure machine to machine, M2M communications comprising:
a first communications interface;
a second communications interface; and
logic configured to:
  receive over the first communications interface an application programming interface, API, request from a virtual private network, VPN, server, wherein the API request includes credentials of the VPN and optionally, credentials of the VPN server, provision over the second communications interface one or more M2M devices with the credentials of the VPN and optionally, credentials of the VPN server, and in response to the API request provide credentials of the one or more M2M devices successfully provisioned with the credentials of the VPN and optionally, credentials of the VPN server. The DM server or broker may act between the VPN server and the M2M devices.

Advantageously, provisioning the credentials of the VPN server may use general bootstrapping architecture, GBA. This further improves security.

Optionally, the logic may be further configured to receive a CA public key, CA certificate, VPN server public key, VPN server certificate and/or request for a VPN server certificate over the API, and provision each of the one or more M2M devices with a public key or certificate, to allow the M2M devices to authenticate the VPN server. This can be especially useful for M2M devices that are not already securely provisioned with suitable public key(s) and/or certificate(s).

Optionally, the logic may be further configured to generate a cryptographic private and public key pair for each M2M device and provision each of the one or more M2M devices with the private key of the generated cryptographic key pair. This can be especially useful for M2M devices unable to generate their own keys.

According to a third aspect there is provided a virtual private network, VPN, server comprising:

a communications interface; and logic, stored instructions or a processor configured to:

request credentials from a device manager, DM, server of one or more machine to machine, M2M, devices over an application programming interface, API, wherein the request includes credentials of the VPN and optionally, credentials of the VPN server, receive a response to the request, wherein the response includes credentials of the one or more M2M devices successfully provisioned with the credentials of the VPN, and enable a VPN over the communications interface for the one or more machine to machine, M2M, devices.

According to a fourth aspect there is provided a machine to machine, M2M, device comprising:

a first communications interface;

a second communications interface; and logic, stored instructions or a processor configured to:

be provisioned with virtual private network, VPN, credentials by the device management, DM, server over the first communications interface, and enable a VPN to be set up over the second communications interface with the VPN server using the VPN credentials.

Optionally, the logic may be further configured to receive a CA public key, CA certificate, VPN server public key, or VPN server certificate over the first communications interface, and use such credential(s) to authenticate the VPN server over the second communications interface.

Optionally, the logic may be further configured to generate a key pair and to provide the DM server with a public key of the generated key pair for the VPN server to use to establish the VPN with the M2M device. Therefore, the VPN server can authenticate and/or validate the M2M devices as the VPN is initiated.

Preferably, the logic may be further configured to enable to the M2M device to be be provisioned with credentials of the VPN server.

According to a fifth aspect there is provided a method for providing secure machine to machine, M2M, communications using a virtual private network, VPN, server and a device manager, DM, server, the method comprising the steps of:

the VPN server issuing an application programming interface, API, request to the DM server wherein the request includes credentials of the VPN;

the DM server provisioning the one or more M2M devices with the credentials of the VPN;

the DM server providing the VPN server with an indication of the one or more M2M devices successfully provisioned as an API response;

setting up a VPN between the VPN server and the one or more M2M devices using the provided credentials.

Preferably, the one or more M2M devices may be provisioned with the credentials of the VPN by the DM server using general bootstrapping architecture, GBA.

Optionally, the method may further comprise the step of:

the DM server obtaining credentials of one or more M2M devices for setting up the VPN, wherein the API response to VPN server includes the credentials of the one or more M2M devices. Confirmation of successfully provisioning the M2M devices with the VPN server's credentials may come in the form of credentials of each M2M device successfully provisioned.

Preferably, the credentials of the VPN server may be provisioned to the one or more M2M devices by the DM server using general bootstrapping architecture, GBA.

Optionally, the API request of the VPN server may further include identifiers of one or more further VPN servers, the method further comprising the step of the DM server providing the one or more further VPN server with the credentials of the one or more M2M devices. In other words, alternative or additional VPN servers may be included and the M2M devices may be provisioned so that they can connect to such servers as well. This can help with redundancy and load balancing, for example.

Optionally, the method may further comprise the step of the DM server providing the VPN server with information to identify a different set of one or more M2M devices successfully provisioned as a further API request and response. In other words, the set of M2M devices may be updated. This may be a full set of M2M devices or a delta (adding or removing devices). The VPN server may then refuse to initiate a VPN for M2M devices no longer in the set (even if they were previously provisioned) or allow newly added devices.

Optionally, the VPN server API request may include an identifier of the VPN server and one or more identifiers of the M2M devices.

Optionally, the API response may include a cryptographic key for each M2M device successfully provisioned with the VPN credentials.

Optionally, the method may further comprise the step of sharing the cryptographic key of the each M2M device between the DM server and the device using general bootstrapping architecture, GBA.

Optionally, the cryptographic key may be any one of:

Ks_NAF, derived from Ks_NAF, or sent to or from each M2M device protected using an existing Ks_NAF.

Optionally, the API response may include a device certificate associated with each of the M2M devices.

Optionally, the method may further comprise the step of sharing or establishing the device certificate of each M2M device between the DM server and the device using general bootstrapping architecture, GBA.

Optionally, the API request may include a group key of the VPN and the API response includes an indication of each M2M device successfully provisioned with the VPN group key.

Optionally, the method may further comprise the step of sharing the group key of the VPN between the DM server and each device using general bootstrapping architecture, GBA.

Preferably, the group key may be protected using Ks_NAF.

Optionally, the API request may include a cryptographic key of the VPN server, and the API response may include an indication of each M2M device successfully provisioned with the VPN server key.

Optionally, the API request may include a server certificate of the VPN server and the API response includes an indication of each M2M device successfully provisioned with the VPN server.

Optionally, the method may further comprise the step of sharing the server certificate of the VPN server between the DM server and the device using general bootstrapping architecture, GBA.

Optionally, the server certificate may be self-signed. This reduces PKI overheads. The self-signed certificate of the VPN Server may be sent to each M2M device over a secure link between DM Server and M2M device. The VPN server certificate may be integrity protected using Ks_NAF, or a key derived from Ks_NAF).

Advantageously, each M2M device may generate a key pair and a self-signed certificate. The method may further comprise the step of sending the (self-signed) device certificate to the DM server, preferably over a secure link between M2M device and DM Server (e.g. it may be integrity protected using Ks_NAF, or a key derived from Ks_NAF).

Optionally, the DM server may generate the key-pair and self-signed certificate on behalf of the M2M device. In this case, a private key and self-signed certificate is sent to the M2M device preferably over a secure link between DM Server and M2M device (e.g. it is encrypted and integrity protected using Ks_NAF, or a key derived from Ks_NAF).

Preferably, the API request may further include credentials of the VPN server, the method may further comprise the DM server provisioning the one or more M2M devices with the credentials of the VPN server.

Optionally, the VPN server API request may include a VPN certificate request.

Optionally, the API response may include any one or more of: a certificate authority (CA) certificate, a VPN server certificate issued by the CA, an indication of the one or more M2M devices successfully provisioned with certificates under the CA.

The methods described above may be implemented as a computer program comprising program instructions to operate a computer. The computer program may be stored on a computer-readable medium.

According to a sixth aspect, there is provided an application programming interface, API, configured to:

issue a request from a virtual private network, VPN, server to a device manager, DM, server, wherein the request includes credentials for setting up a VPN between the VPN server and one or more M2M devices, and send a response to the VPN server from the DM server, wherein the response includes an indication of the one or more M2M devices provisioned with the VPN credentials.

Optionally, the API request may further include credentials of the VPN server.

Optionally, the API response may further include credentials of the one or more M2M devices provisioned with the VPN credentials.

The computer system may include a processor such as a central processing unit (CPU). The processor may execute logic in the form of a software program. Logic may take the form of stored instructions or a processor configured to carry out particular instructions. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention. For example, any feature or aspect of any or all of the M2M device, the VPN server and/or the DM server may be used together in any combination and operated with any of the described method features and steps.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
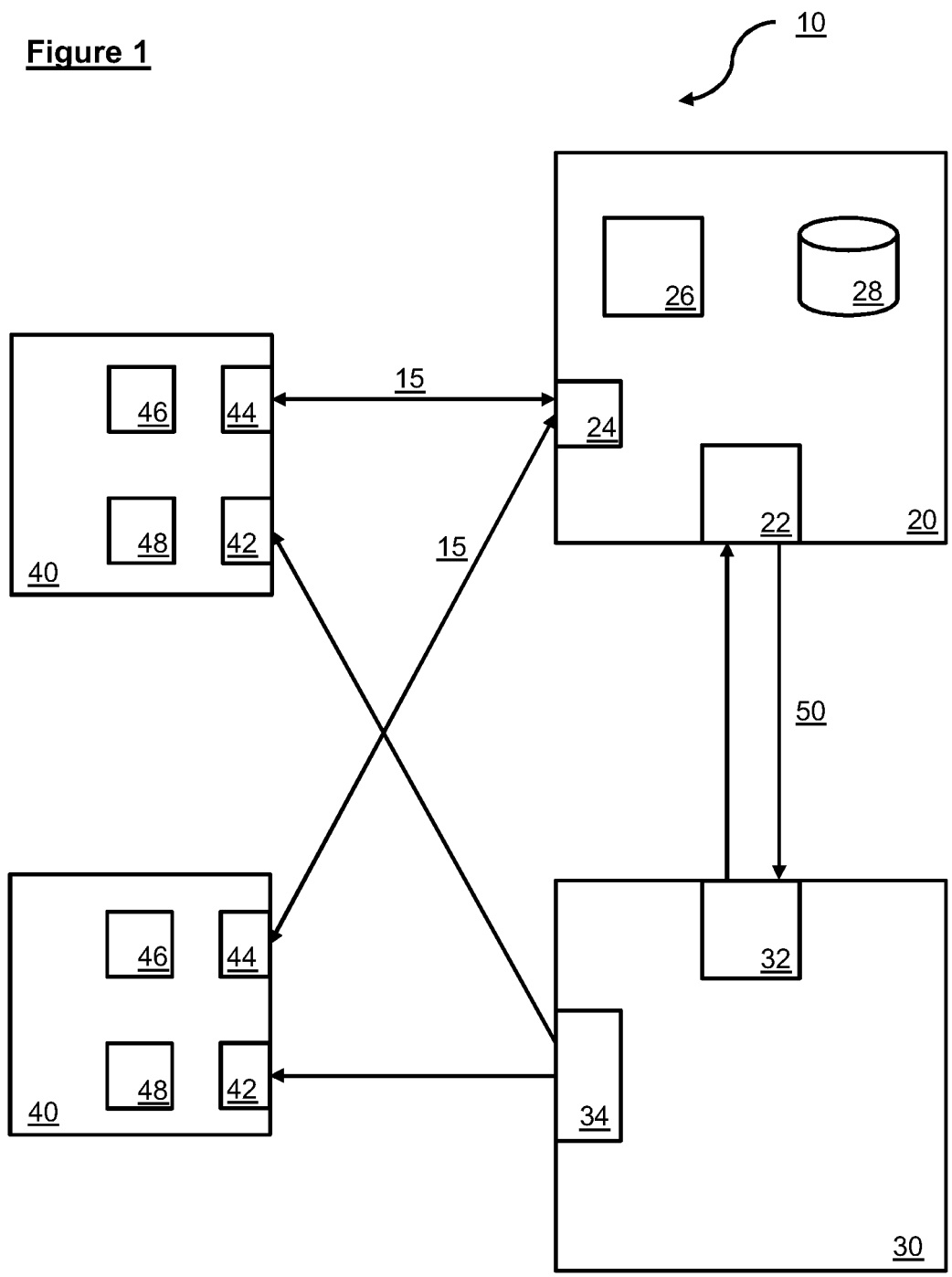
FIG. 1 shows a schematic diagram of a system for establishing a virtual private network, VPN, between M2M devices and a VPN server.

FIG. 1 shows a schematic diagram of a system 10 for establishing a virtual private network (VPN) 15 between one or more machine to machine (M2M) devices 40 (any number may be included) and one or more VPN servers 20. A device manager (DM) server 30 (or more than one) acts as a broker between the M2M devices 40 and VPN server 20. The VPN server 20 communicates with the DM server 30 using an application programming interface (API) 50. A communications interface 22 on the VPN server 20 and a communications interface 32 on the DM server 30 send and receive API requests and responses, respectively.

The DM server 30 has a further communications interface 34 for communicating with the M2M devices 40. Each M2M device 40 has two communications interfaces 42, 44. Interface 42 is used to communicate with the DM server 30. Interface 44 is used to set up a VPN with the VPN server 20.

The DM server 30 provisions the M2M devices 40 with VPN credentials (e.g. keys) requested by the VPN server 20 so that the VPN 15 may be established between them. Each M2M device 40 stores these credentials within a storage or memory 46. This may be within a subscriber identity module (SIM) card (UICC) or other secure execution environment or other memory, for example. Each M2M device 40 also has a processor 48 for executing logic and other functions. This may be internal or external to the SIM card (UICC). Similarly, the VPN server 20 has a processor 26 and a database 28. The API response from the DM server 30 includes data or other indications of the identities of M2M devices 40 that have been successfully provisioned with the VPN credentials. The identities of the M2M devices 40 may be stored in database 28 within the VPN server 20, for example.

In this embodiment (as well as other possible arrangements), General Bootstrapping Architecture (GBA) (see http://www.3gpp.org/DynaReport/33220.htm) provides secure communications between the DM server 30 and each M2M device 40. Therefore, the DM server 30 may be a network application function (NAF). In this way, the VPN credentials may be securely provisioned on each M2M device 40 without having to provision them in advance, which can be technically and administratively difficult and expensive. Furthermore, by updating the data in database 28, then the VPN 15 availability to each particular M2M device 40 may be managed. For example, individual M2M devices 40 may be added or removed from the database and so in turn this can be used to allow or deny the use of a VPN 15 for each device 40 or groups of devices.

Figure 2:
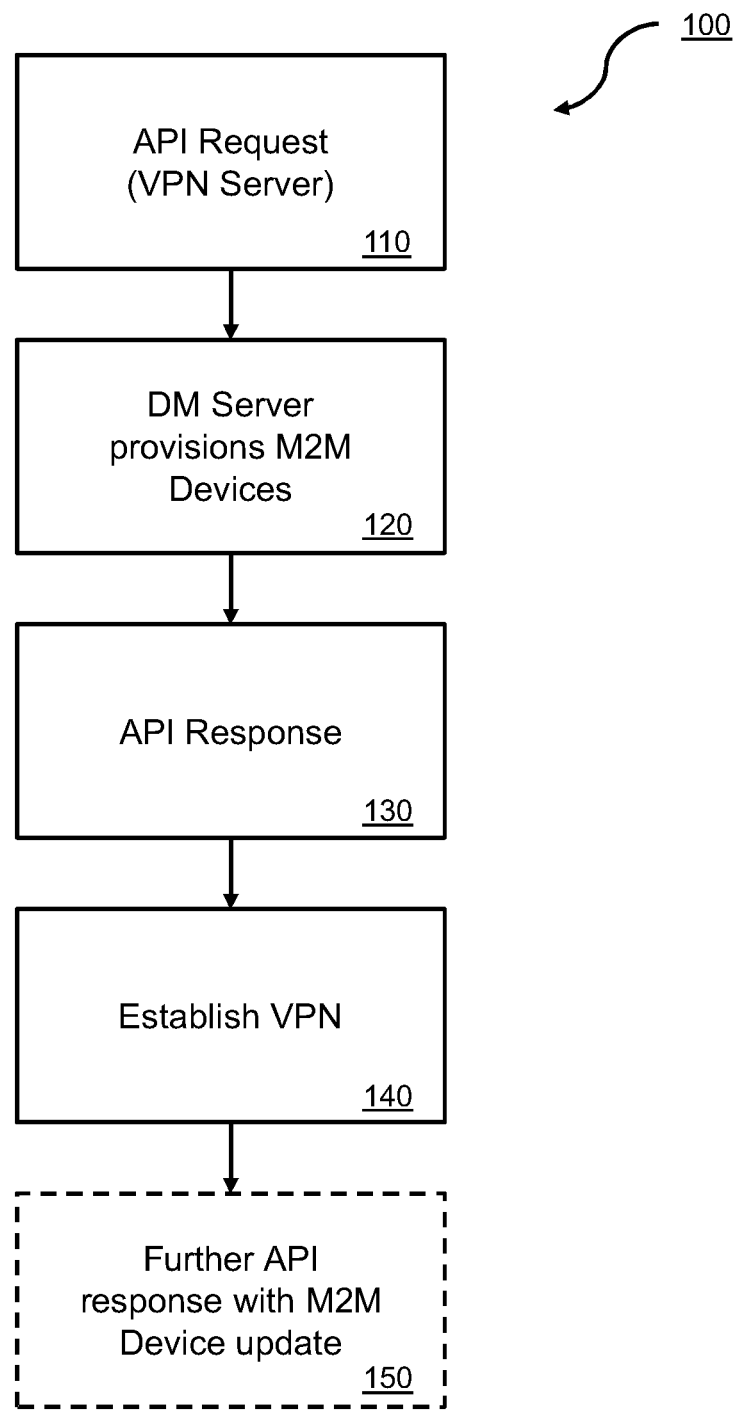
FIG. 2 shows a flowchart of a method for establishing a VPN between M2M devices and a VPN server.

FIG. 2 shows a flowchart of a method 100 for operating the system 10 described with regards to FIG. 1. This method 100 starts with the VPN server 20 issuing an API request over the API 50 the DM server 30. This request includes the credentials (e.g. a key or keys for setting up a VPN) of the VPN server 20. The request may also contain a list of M2M devices 40 that are to be provisioned with the VPN server 20 credentials. The DM server 30 then provisions each M2M device 40 with the VPN server 20 credentials at step 120. The DM server 30 then provides an API response over the API 50 at step 130. In this embodiment, the API response includes an indication of the M2M devices 40 that have been successfully provisioned with the VPN server's credentials. The VPN server 20 and/or the M2M devices 40 may establish a VPN 50 at step 140 using the provisioned credentials. As described with regards to FIG. 1, the list of M2M devices 40 contained in database 28 of the VPN server 20 may be updated using further API responses at step 150 as and when required.

When provisioning each M2M device 40, the DM server 30 may receive from each M2M device 40 its own credentials that may be in the form of a cryptographic key, for example. Alternatively, e.g. for simple M2M devices in this embodiment, the DM server 30 will generate the keys for each M2M device 40. In this embodiment, the M2M device 40 credentials (or other data to identify the M2M devices 40) are returned to the VPN server 20 as part of the API response.

Figure 3:
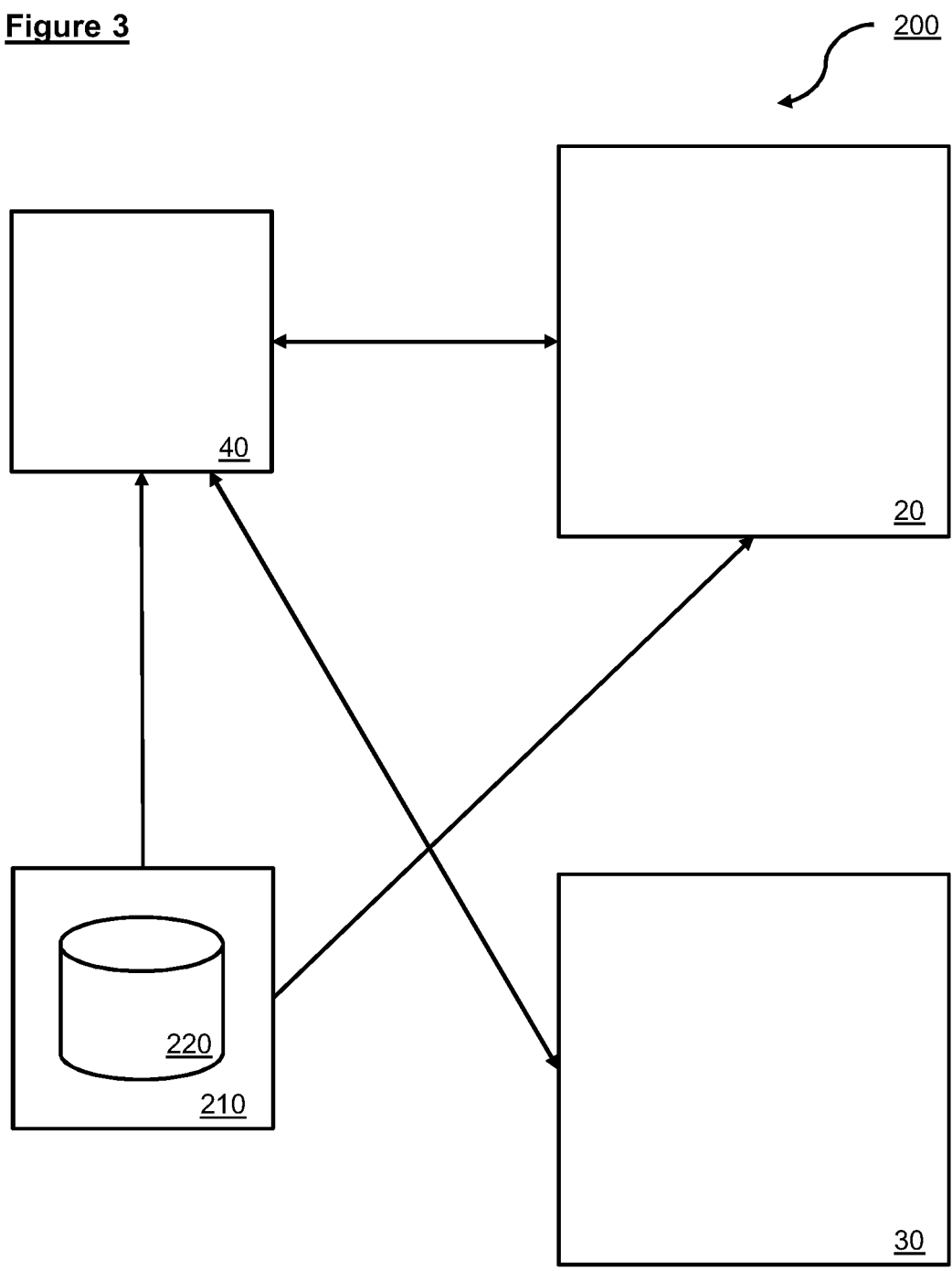
FIG. 3 shows a schematic diagram of a further system for establishing a VPN between M2M devices and a VPN server.

FIG. 3 shows a schematic diagram of a further system 200 for providing VPNs to M2M devices 40. The same or similar items in FIG. 3 have the same reference numerals as used previously. Additionally, a certificate authority (CA) 210 that contains stored (or generated) cryptographic certificates in a database 220 is included in this system 200. This CA 210 allows credentials to be signed under a common trust point, for use within VPNs that expect such a trust point. These may be the credentials of the individual M2M devices 40 or the VPN server 20. Although not shown in the figures, more than one DM server 30 and/or VPN server 20 may be used with any number of M2M devices 40.

3GPP GBA allows shared secrets to be established remotely between an M2M Device and a DM Server and/or any other Network Application Function (NAF). This is based on a secret K or Ki shared between the SIM card in the device and an HLR or HSS. The network architecture described with reference to FIGS. 1 to 3 enables an API 50, running between a VPN server 20 and a DM server 30 (e.g. NAF), to then use GBA protocols to manage the establishment of the keys for a VPN 15 between the VPN server 20 and relevant M2M devices 40 to be authenticated at the VPN server 20.

An advantage of this feature is that the need to manually distribute keys, or to send pre-shared keys, over an unsecured interface to network devices is mitigated. Further, the enterprise cost and complexity of establishing a PKI for use with a VPN is reduced.

As described above, the DM server 30 acts as a "broker" (in a specific example using the DM server 30 in the role of a NAF within GBA) between a VPN server 20 and a set of M2M devices 40 where a VPN connection is to be established. In particular, the "broker" and VPN server 20 exchange data over a first interface, data which will then be employed to establish a VPN connection between the VPN server 20 and one or more M2M devices 40. The broker provisions (over a secure communication) the one or more M2M devices 40 with credentials to establish said VPN connection. The exchange of communications between the broker and the VPN server 20 includes details of the VPN server 20 and of the one or more M2M devices 20 the server wishes to connect to. This may also (and optionally) include a key or security certificate with which the M2M devices 40 are provisioned to enable them to connect to the VPN server 40. The communications can also report to the VPN server 20 the identities (or other identifying data) of the M2M devices 40 that have been successfully provisioned and may include a key or a certificate to be used by each such provisioned M2M device 40.

The API 50 may be a network API run between the VPN Server 20 (e.g. VPN concentrator at enterprise premises) and the device that plays the role of a NAF within the Generic Boostrapping Architecture. The API 50 would request credentials for a VPN 15 that is to be set up between the VPN Server 20 and a list of identified M2M devices 40 (for instance a list of M2M device serial numbers, such as IMEIs, MAC addresses or possibly a list of IMSIs or MSISDNs for SIM cards within the target devices).

As part of the request, the VPN Server 20 will provide credentials that it wishes to have installed to the various M2M devices 40 in order for them to be able to recognize and authenticate the VPN server 20. As part of the response, the VPN Server 20 may receive credentials that will allow it in turn to securely recognize and authenticate the intended the M2M devices 40. The API 50 may have sub-cases covering both shared secret key (either group key, or individual keys for each target device) and public key credentials.

Further enhancements to the system may be made. In particular, these relate to the types of information provided in the API request and response and the types of credentials provided to the M2M devices 40 (and in some cases to the VPN server 20).

1. Request Parameters. The API request may include: VPN Server ID, List of M2M Device IDs.

Response Parameters: List of (M2M Device, Shared Key) pairs successfully provisioned, one unique key per device.

GBA may be used. In this case the key per device is either a Ks_NAF, or derived from a Ks_NAF, or sent protected to each M2M device 40 using an existing Ks_NAF.

2. Request Parameters. The API request may include: VPN Server ID, List of M2M Device IDs, VPN Group Key.

Response Parameters: List of M2M Devices successfully provisioned with Group Key The DM manager 30 (e.g. NAF which receives the request) establishes a Ks_NAF with each target device (or has one already). This is then be used to protect distribution of a Group Key to the target M2M devices 40. This scenario is particularly suitable for fairly small deployments (e.g. SME).

3. Request Parameters. The API request may include: VPN Server ID, List of M2M Device IDs, VPN Server Certificate.

Response Parameters: List of (M2M Device, Device certificate) pairs, one device certificate for each device provisioned.

The public key certificates may be self-signed to save on PKI costs and overheads or raw public keys may be used instead of certificates when VPN software supports them. The DM server 30 or NAF which receives the request establishes a Ks_NAF with each target device (or has one already). This is then used to protect distribution of the VPN Server Certificate to the target devices and protect retrieval of self-signed certificates from the same devices (with each key-pair generated on device). As a further variant, the private key for each device may be generated by the DM server 30 (NAF) and distributed being protected using the Ks_NAF. This may apply where a device has very limited hardware, and is unable to generate a key pair itself.

4. Request Parameters: VPN Server ID, List of M2M Device IDs, VPN Certificate Request.

Response Parameters: CA Certificate, VPN Server Certificate as issued by CA, List of M2M Device IDs which have been provisioned with certificates under the CA.

The process flow is similar to variant 3 but instead of self-signed certificates, each device creates a self-signed certificate request and then has this re-signed by a Certification Authority (CA) key. The CA may be pre-existing or an "ad hoc" CA may be set up for each VPN and the CA key then thrown away. This would save on PKI costs and overheads.

Further variants include the calling server specifying a list of other VPN Servers that are provided credentials for joining the VPN. This would allow more flexibility than with a many-to-1 VPN (many devices connecting to one VPN server 20 or concentrator).

Changes to the VPN (adding or removing devices) may be achieved in each case by calling the API 50 again but with a revised device list. This may work with the DM server 30 providing the VPN server 20 with a revised list (for storage in database 28) or the VPN server 20 providing the DM server 30 with new VPN server credentials to provision only on a new set of M2M devices 40 (i.e. the old credentials may be revoked or no longer function). Alternatively, a "delta" API ("Change VPN") may be supported to save bandwidth (in either direction).

Given the ease with which the API can be called and with which a new Ks_NAF can be re-established to each device (as needed), the VPN may be re-keyed completely (including changing the CA key, if there is one) on a fairly regular basis e.g. at least once per year. This reduces a lot of the typical PKI overheads associated with certificate expiry or revocation.

The DM server 30 or NAF could be hosted by a network provider, a specialist security company, or the provider of VPN equipment or by the enterprise itself in some cases. These forms of hosting would allow trust models whereby the network provider never sees or has access to any of the VPN keys or credentials (if that is what the customer desires).

These features further avoid any necessity to manually distribute keys or to send pre-shared keys over an unsecured interface.

The proposed process avoids a lot of the enterprise cost and complexity of establishing a PKI for use with a VPN, and also frees the PKI from dependency on Active Directory integration (and hence has wider applicability across Device OS).

As will be appreciated by the skilled person, details of the above embodiment may be varied without departing from the scope of the present invention, as defined by the appended claims.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A system for providing secure machine to machine (M2M) communications, the system comprising:
   a first network entity implementing a device management (DM) server configured to obtain credentials of one or more M2M devices and provision the one or more M2M devices with credentials of a virtual private network (VPN) server;
   an application programming interface (API); and
   a second network entity implementing a VPN server comprising:
   a first communications interface configured to communicate API requests and API responses with the API; and
   a second communications interface configured to provide a VPN for the one or more M2M devices, and wherein the VPN server is implemented to:
   issue an API request, wherein the request includes the credentials of the VPN server,
   receive an API response from the DM server including an indication of the one or more M2M devices provisioned with the credentials of the VPN server, and
   initiate a VPN over the second interface between the one or more M2M devices and the VPN server.

2. The system according to claim 1, wherein the DM server is a network application function (NAF) and/or the API response includes credentials of the one or more provisioned M2M devices, the credentials including any one or more of: M2M device identifier, IMEI, MAC address, IMSI, MSISDN, a device key for each M2M device, and a device certificate for each device.

3. The system according to claim 1, wherein the request comprises one or more request parameters selected from the group consisting of: VPN server identifier, VPN group key, certificate authority (CA) public key certificate, VPN server public key, VPN server certificate and VPN server certificate request, and/or the API request further includes credentials of the VPN server.

4. A device management (DM) server system for providing secure machine to machine (M2M) communications, the DM server system comprising:

a network entity implementing a first communications interface and a second communications interface, and wherein the network entity is configured to:
receive over the first communications interface an application programming interface (API) request from a virtual private network (VPN) server, wherein the API request includes credentials of the VPN server,
provision over the second communications interface one or more M2M devices with the credentials of the VPN server, and
in response to the API request, provide credentials of the one or more M2M devices successfully provisioned with the credentials of the VPN server.

5. The DM server system according to claim 4, wherein provisioning the credentials of the VPN server uses general bootstrapping architecture (GBA) and/or the network entity is further configured to:
receive a CA public key, CA certificate, VPN server public key, VPN server certificate or request for a VPN server certificate over the API; and
provision each of the one or more M2M devices with the received CA public key, CA certificate, VPN server public key, and/or VPN server certificate, to enable the one or more M2M devices to authenticate the VPN server.

6. The DM server system according to claim 4, wherein the network entity is further configured to generate a cryptographic private and public key pair for each M2M device and provision each of the one or more M2M devices with the private key of the generated cryptographic key pair.

7. The DM server system according to claim 4, wherein the API request further includes credentials of the VPN server.

8. A virtual private network (VPN) server system, comprising:
a network entity implementing a communications interface, and
wherein the network entity is configured to:
request credentials from a device manager (DM) server of one or more machine to machine (M2M) devices over an application programming interface (API), wherein the request includes credentials of the VPN server system,
receive a response to the request, wherein the response includes credentials of the one or more M2M devices successfully provisioned with the credentials of the VPN server system, and
enable a VPN over the communications interface for the one or more M2M devices.

9. The VPN server system according to claim 8, wherein the API request further includes credentials of the VPN server system.

10. A machine to machine (M2M) device, comprising:
a first communications interface;
a second communications interface; and
logic configured to:
be provisioned with credentials of a virtual private network (VPN) server by a device management (DM) server over the first communications interface, and
enable a VPN to be set up over the second communications interface with the VPN server using the credentials of the VPN server;
wherein the logic is further configured to receive the credentials in the form of a CA public key, CA certificate, VPN server public key, or VPN server certificate over the first communications interface, and use the received credentials to authenticate the VPN server over the second communications interface, and/or the logic is further configured to generate a key pair and to provide the DM server with a public key of the generated key pair for the VPN server to use to establish the VPN with the M2M device.

11. The M2M device according to claim 10, wherein the logic is further configured to enable to the M2M device to be provisioned with the credentials of the VPN server.

12. A method for providing secure machine to machine (M2M) communications using a virtual private network (VPN) server and a device manager (DM) server, the method comprising:
the VPN server issuing an application programming interface (API) request to the DM server, wherein the request includes credentials of the VPN server;
the DM server provisioning the one or more M2M devices with the credentials of the VPN server;
the DM server providing the VPN server with an indication of the one or more M2M devices successfully provisioned as an API response; and
setting up a VPN between the VPN server and the one or more M2M devices using the credentials of the VPN server.

13. The method according to claim 12, wherein the one or more M2M devices are provisioned with the credentials of the VPN server by the DM server using general bootstrapping architecture (GBA) and/or further comprising the DM server obtaining credentials of one or more M2M devices for setting up the VPN, wherein the API response to the VPN server includes the credentials of the one or more M2M devices.

14. A method for providing secure machine to machine (M2M) communications using a virtual private network (VPN) server and a device manager (DM) server, the method comprising:
an application programming interface (API) issuing a request from the VPN server to the DM server, wherein the request includes credentials of the VPN server for setting up a VPN between the VPN server and one or more M2M devices, and
the application programming interface (API) sending a response to the VPN server from the DM server, wherein the response includes an indication of the one or more M2M devices provisioned with the credentials of the VPN server,
wherein the one or more M2M devices comprise
a first communications interface;
a second communications interface; and
logic configured to:
be provisioned with credentials of a virtual private network (VPN) server by a device management (DM) server over the first communications interface, and
enable a VPN to be set up over the second communications interface with the VPN server using the credentials of the VPN server,
and wherein the logic is further configured to receive the credentials in the form of a CA public key, CA certificate, VPN server public key, or VPN server certificate over the first communications interface, and use the received credentials to authenticate the VPN server over the second communications interface, and/or the logic is further configured to generate a key pair and to provide the DM server with a public key of the generated key pair for the VPN server to use to establish the VPN with the M2M device.

* * * * *